United States Patent [19]
Jackson

[11] 3,964,292
[45] June 22, 1976

[54] GAS DETECTING APPARATUS AND METHODS

[75] Inventor: Jesse Milne Jackson, Greensboro, N.C.

[73] Assignee: Bell Telephone Laboratories, Incorporated, Murray Hill, N.J.

[22] Filed: Feb. 27, 1975

[21] Appl. No.: 553,522

[52] U.S. Cl.............................. 73/40.5 R; 55/158; 73/23
[51] Int. Cl.² ........................................... G01M 3/04
[58] Field of Search................. 73/23, 19, 421.5 R, 73/40.5 R, 41.9; 55/158, 270; 23/232 R, 254 R

[56] References Cited
UNITED STATES PATENTS

| | | | |
|---|---|---|---|
| 182,423 | 9/1876 | Douchy................................... | 73/23 |
| 634,687 | 10/1899 | Hartenfels.............................. | 73/23 |
| 1,016,305 | 2/1912 | Turquand et al. ...................... | 73/23 |
| 3,043,145 | 7/1962 | Hoffman......................... | 73/421.5 R |
| 3,093,001 | 6/1963 | Williams ........................ | 73/421.5 R |
| 3,357,257 | 12/1965 | Herndon et al. ............... | 73/421.5 R |
| 3,438,241 | 4/1969 | McKinley............................... | 73/19 |
| 3,503,186 | 3/1970 | Ward ..................................... | 55/158 |
| 3,731,523 | 5/1973 | Vissers et al............................ | 73/19 |
| 3,797,299 | 3/1974 | Nelson et al............................ | 73/19 |

Primary Examiner—Richard C. Queisser
Assistant Examiner—Stephen A. Kreitman
Attorney, Agent, or Firm—H. L. Logan

[57] ABSTRACT

Apparatus and methods are disclosed for detecting a particular gas occurring at any point along a path through a given environment. A tubing having a wall through which the particular gas readily permeates is provided for placement along the path of interest. This tubing is structured so that the particular gas can enter the tubing only by permeating the tubing wall. Detection of the gas and the approximate location of permeation is achieved by withdrawing gases from within the tubing while monitoring both the withdrawn gases and the elapsed time.

3 Claims, 1 Drawing Figure

U.S. Patent  June 22, 1976  3,964,292
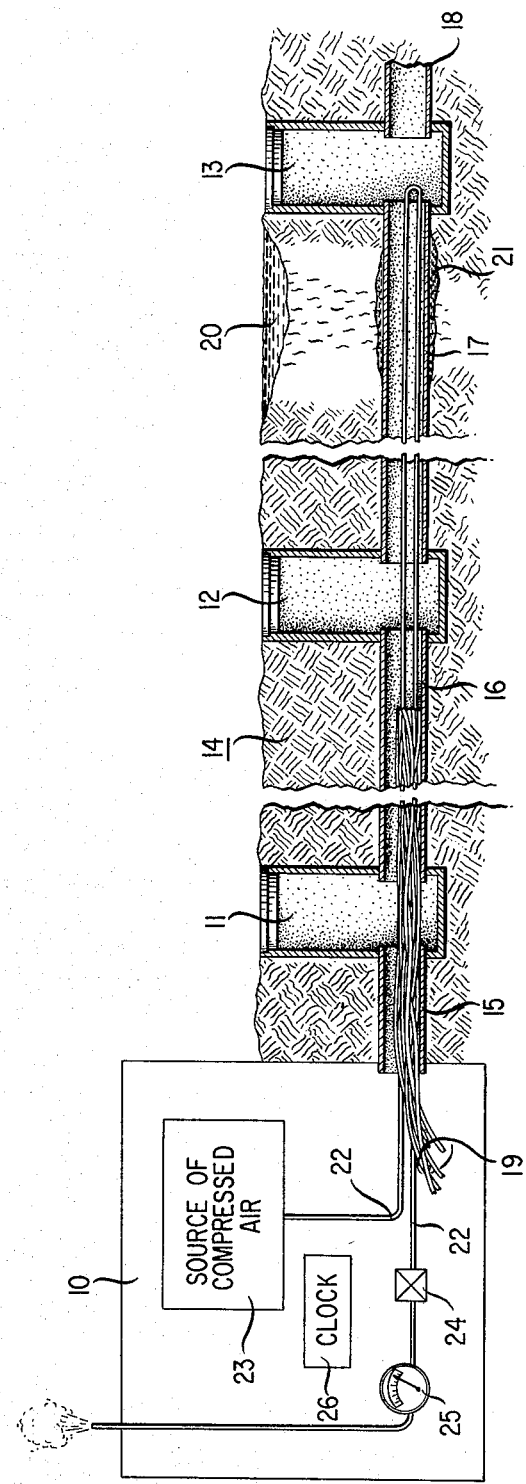

GAS DETECTING APPARATUS AND METHODS

BACKGROUND OF THE INVENTION

1. Field of the Invention

This invention relates to the detection of unwanted gases within a particular environment.

2. Description of the Prior Art

Early knowledge of leakage of certain products is often desired in order to take steps to prevent further leakage of or damage by these products. Petroleum product seepages into the earth, for example, have damaged underground telephone cables. In particular, vapors from such products are known to penetrate, over a period of several months, jacketed telephone cables to the extent that the cables must be replaced. This, of course, involves undesired service outages and maintenance costs. Similar problems exist in other fields — as, for example, the loss of refrigerant gases which may damage food under refrigeration.

The prior art discloses various apparatus for detecting unwanted gases. To the best of applicant's knowledge, these apparatus detect such gases at locations defined by openings associated with the apparatus. As such apparatus must provide an opening for each location to be monitored, their initial cost and maintenance cost become prohibitive when the environment to be monitored is extensive and the locations to be monitored are relatively close together. Such apparatus becomes totally impractical, for example, when it is desired to monitor the environment surrounding the entire length of an underground cable segment as distinguished from monitoring at discrete locations within the environment.

SUMMARY OF THE INVENTION

An object of the present invention is to detect, in an inexpensive manner, a particular gas appearing at any point along a path within a given environment.

This and other objects are achieved by the use of tubing through which the particular gas readily permeates. In use, this tubing coextends with the path of interest so that the particular gas can enter the tubing only by permeating its wall. Reduction of gas pressure within one end of the tubing causes gases within the tubing to exit at that end. These gases are monitored to detect the presence of the unwanted gas.

In accordance with the invention, the location of the permeation of the unwanted gas may be approximated by measuring the time interval between the reduction of the gas pressure and the detection of the unwanted gas.

In a preferred use of the invention, air at a pressure in excess of atmospheric pressure is injected into the end of the tubing remote from the end at which the pressure is reduced so that the pressure may be reduced by merely permitting the gases within the tubing to exit to the atmosphere through a detector responsive to the unwanted gas.

Practice of the present invention offers several advantages. One advantage is that the detection of a particular gas anywhere along the path of the tubing is possible. A second advantage is that the invention may be practiced at relatively little expense. Another advantage is that permeation of the tubing wall is at a rate whereby early detection is possible. With polyethylene tubing, for example, detection of gasoline vapor which had permeated the tubing wall was achieved within 24 hours. Still another advantage is that tubing material — such as polyethylene — may be selected which reverts to its original state shortly after the undesired vapors are eliminated. Still further, the invention may be practiced from a remote station, as discussed hereinafter.

BRIEF DESCRIPTION OF THE DRAWING

The drawing shows a portion of a typical underground telephone cable system in which the invention is practiced.

DETAILED DESCRIPTION

A portion of a typical underground telephone cable system is shown in the drawing. The drawing shows a cable vault 10 and three manholes 11, 12, and 13. The vault is partially buried in the earth 14 while the manholes are completely buried so that their uppermost portions are substantially flush with the surface of earth 14. A conduit 15 passes underground between vault 10 and manhole 11. Similarly, conduits 16 and 17 pass between manholes 11 and 12 and manholes 12 and 13, respectively. A final conduit 18 leads away from manhole 13 to an unillustrated manhole. A group of jacketed telephone cables 19 pass from vault 10 through conduits 15 through 18.

At a point between manholes 12 and 13, a petroleum leakage in the form of a pool 20 of gasoline is shown. Although this is shown on the surface directly above conduit 17, the leakage may be from a tank below the surface and/or from a point other than directly above conduit 17. Regardless of where the leakage occurs, there is a tendency for the gasoline to disperse through earth 14. Such a dispersion will frequently result in a smaller pool of gasoline collecting around a conduit. This is shown in the drawing as pool 21 formed around conduit 17. Vapors from this pool of gasoline penetrate, over a period of several months, the walls of conduit 17 and the jackets of cables 19. Once they have worked their way through the jackets of cables 19, transmission through these cables becomes adversely affected and the cables must be replaced.

An indication of gasoline vapors in the conduit before these vapors have had a chance to penetrate the cables would permit one to purge the conduit and to locate and eliminate the leakage before the cables are damaged. This is achieved in accordance with the present invention through the use of a tubing 22 made of material which is permeable to gasoline vapors. One end of tubing 22 is connected in vault 10 to a source 23 of compressed air. The tubing then passes through conduits 15, 16, and 17 to manhole 13 where it reverses direction and passes back through the conduits to vault 10. The tubing is then connected to a valve 24 which in turn is connected to a gas analyzer 25. Analyzer 25 is vented to the outside of vault 10. The connection between valve 24 and analyzer 25 and the vent connection for analyzer 25 may comprise the same type of tubing as tubing 22, although other tubing materials may be used. Vault 10 also contains a clock 26.

In accordance with the invention, source 23 injects air at a point in tubing 22 remote from analyzer 25. This pressure may be in the order of ten pounds per square inch above atmospheric pressure. Valve 24 is normally closed. When gasoline vapors are present in conduit 17, these vapors permeate the wall of tubing 22 and remain within the tubing in close proximity to the area of permeation. When valve 24 is opened, air from source 23 forces the contents of tubing 22 to be purged though analyzer 25. With a substantially fixed air pressure provided by source 23, a relatively constant flow of gases through tubing 22 occurs; in other words, the first air injected by source 23 each time valve 24 is opened requires approximately the same length of time to pass through tubing 22 to analyzer 25. As a consequence, the approximate location of the permeation of the gasoline may be obtained by using clock 26 to measure the time interval between opening valve 24 and the first maximum indication on analyzer 25. (Because tubing 22 makes a round trip between vault 10 and manhole 13, permeation takes place at two locations along its total length and therefore two maximum indications are produced on analyzer 25. As believed apparent from the following discussion, the first of these indications lends itself more readily to approximating the location of the permeation.)

While each system should be individually calibrated, the approximate time interval between opening valve 24 and the first maximum indication of analyzer 25 is inversely related to the square of the ratio of the total length of tubing 22 to the length of tubing 22 from analyzer 25 to the approximate location of the permeation in the following manner:

length of tubing 22 to location of permeation =

$$l \sqrt{\frac{t_2}{t_1}}$$

where:
$l$ = total length of tubing 22,
$t_1$ = time for air from source 23 to pass completely through tubing 22, and
$t_2$ = time interval between opening valve 24 and peak reading on analyzer 25.

If the approximate location of the permeation is not required, timing the interval between opening valve 24 and the peak reading on analyzer 25 is not required. Furthermore, the two ends of tubing 22 need not terminate at the same location. For example, in the drawing, source 23 could be located in manhole 13 so that tubing 22 makes a one-way (as distinguished from a round-trip) excursion between vault 10 and manhole 13.

Tubing 22 may be made of polyethylene which is approximately 800 times more permeable to gasoline vapors than it is to water vapors. Furthermore, it has been found that gasoline vapors permeate polyethylene tubing at a rate whereby such vapors within the tubing are detectable within 24 hours by a relatively simple gas analyzer. Still further, polyethylene tubing reverts to its initial state within several days after removing all gasoline vapors, thus not requiring replacement of the tubing after gasoline vapors have been detected.

It should be appreciated that gasoline vapors at any point along the length of tubing 22 are detectable. In other words, the environment surrounding cables 19 between vault 10 and manhole 13 is monitored for its entire length as distinguished from monitoring at a limited number of discrete points within the environment. Such coverage is believed impossible with prior art apparatus without incurring expenses far in excess of those required for implementing the present invention.

The drawing and above description show a source of compressed air which causes tubing 22 to be purged when valve 24 is opened. The invention may be practiced by using a suction device at the analyzer end of tubing 22 instead of source 23 at the other end.

As appreciated by those skilled in the art, valve 24 may be remotely operated and the indication of analyzer 25 may be transmitted to a remote location, thus permitting the test procedure to be conducted without anyone being physically present in vault 10. The testing of conduits at various locations in a city, for example, is therefore possible from one central location.

The invention has been described for use for detecting gasoline vapors in underground conduits. The invention, however, has uses elsewhere, as, for example, to detect refrigerant gases. This detailed description should not, therefore, be construed as describing the only use for the invention.

What is claimed is:

1. In a gas monitoring apparatus comprising tubing for extension into an environment to be monitored, means for causing at least some gases to exit from said tubing and means for monitoring the exiting gases to detect the presence of a particular gas, the wall of said tubing being readily permeable to said particular gas and, furthermore, said tubing is structured so that said particular gas can enter said tubing only by permeating its wall, an improvement characterized in that
    said tubing extends through an environment which is of a character so that said particular gas may occur at a location adjacent to said tubing,
    means are provided for selectively blocking the passage of gases along the interior of said tubing, and means are provided for measuring the time interval beginning from the unblocking of the passage and ending when said means for monitoring indicates the substantial maximum intensity of said particular gas.

2. Apparatus for detecting and locating a particular gas occurring at any point along an extended path through an environment, said apparatus comprising,
    a tubing which extends along said path and whose wall is readily permeable to said particular gas,
    means for selectively blocking the passage of gases along the interior of said tubing,
    means for causing at least some of any gases in said tubing to exit at one extremity thereof when said last-mentioned means is not blocking,
    a detector connected to said extremity to indicate said particular gas exiting therefrom, and
    means for measuring the time interval between the time when said gases begin to exit said extremity and the time when said detector indicates substantially the maximum intensity of said particular gas.

3. A method for detecting and locating the occurrence of a particular gas at any point along an extended path through an environment, said method comprising the steps of,
    maintaining substantially equal the gas pressure along the interior of a tubing which is permeable to said particular gas, which extends along said path, and, furthermore, which permits said particular gas to enter only by permeation, said gas pressure along the interior of said tubing being maintained substantially equal for a period of time sufficient for permeation by said particular gas when present in proximity to said tubing,
    making the gas pressure along the interior of said tubing unequal to cause at least some of the gases in said tubing to exit at one end of said tubing,
    monitoring said gases exiting said tubing end to detect the presence of said particular gas, and
    measuring the time interval between making unequal said gas pressure along the interior of said tubing and the detection of the maximum concentration of said particular gas.

* * * * *